UNITED STATES PATENT OFFICE.

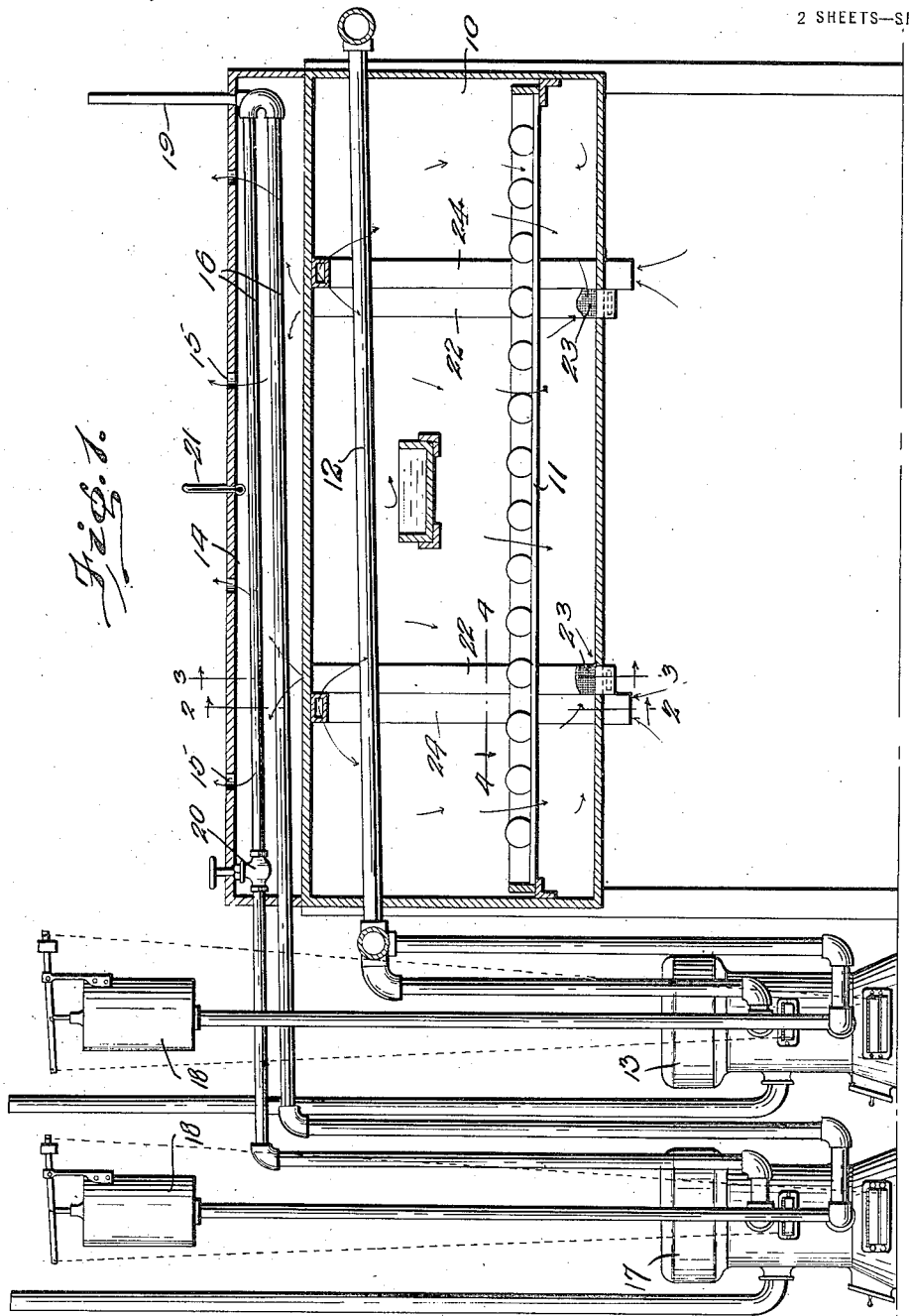

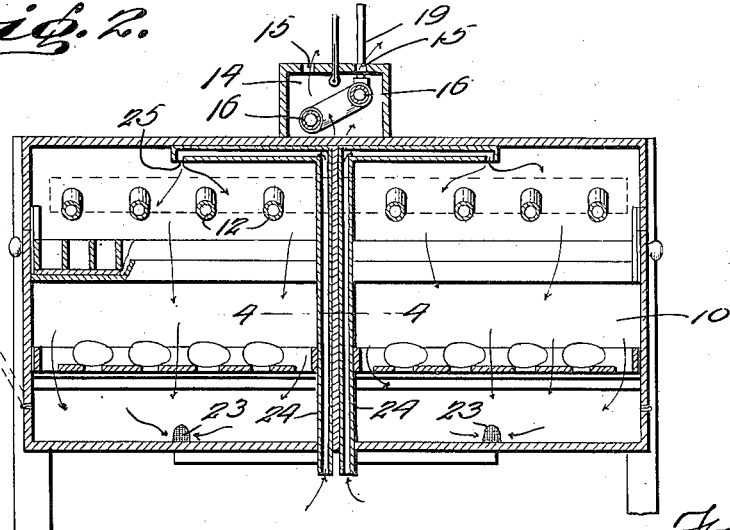
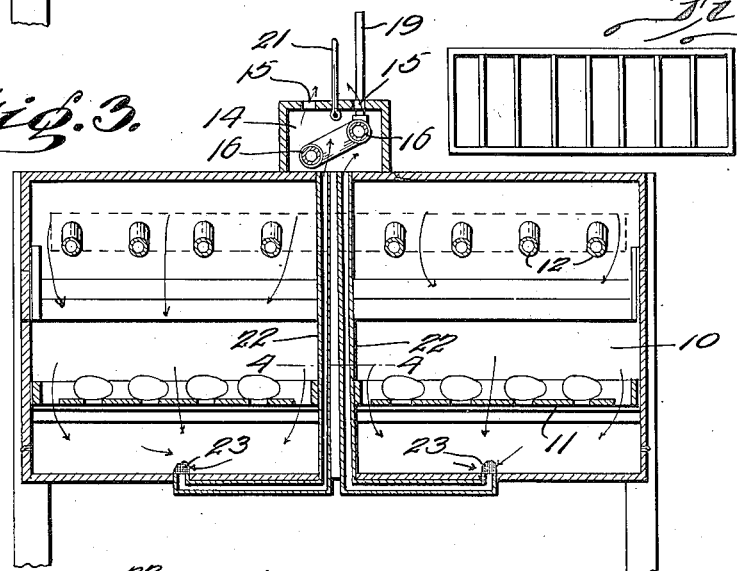
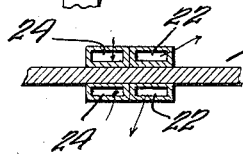

ALFRED THRUSTON POPE, OF LOUISVILLE, KENTUCKY.

INCUBATOR.

1,407,671. Specification of Letters Patent. Patented Feb. 21, 1922.

Application filed October 6, 1920. Serial No. 415,027.

*To all whom it may concern:*

Be it known that I, ALFRED THRUSTON POPE, a citizen of the United States, residing at Louisville, in the county of Jefferson and State of Kentucky, have invented certain new and useful Improvements in Incubators, of which the following is a specification.

This invention relates to incubators and has for its object to provide a device of the class in which the ventilation of the egg chamber is wholly independent of the heating means.

A further object of the invention is to provide an incubator having an egg chamber of substantially the usual and ordinary type with a heating element therein contained and with means for educting the air from the egg chamber to reduce the aerostatic tention below atmosphere and with a conduit communicating with the atmosphere adapted to induct air from the atmosphere to restore the aerostatic desideratum, which will be less than atmosphere under normal working conditions.

A further object of the invention is to provide an incubator having an egg chamber with an auxiliary chamber having a heating element associated therewith and for heating the air therein independently of the heating in the egg chamber with vents from the auxiliary chamber and conduits from the egg chamber to the auxiliary chamber.

With these and other objects in view, the invention comprises certain novel principles, functions, elements, parts and combinations as will be hereinafter more fully described and claimed.

In the drawings,—

Figure 1 is a longitudinal sectional view through the egg chamber, showing in side elevation the heating units;

Fig. 2 is a vertical transverse sectional view taken on line 2—2 of Fig. 1;

Fig. 3 is a vertical transverse sectional view taken on line 3—3 of Fig. 1;

Fig. 4 is a detail horizontal sectional view, taken on line 4—4 of Figs. 1, 2 and 3;

Fig. 5 is a detail plan view of the compartment humidifying pan;

Like characters of reference indicate corresponding parts throughout the several views.

The improved incubator which forms the subject-matter of this application is intended for use in an installation providing several of the units of which the present disclosure is one. The use in a battery, however, is immaterial and the unit herein disclosed is for all practical purposes a complete installation.

The incubator comprises an egg chamber 10 having an egg support 11 of any usual and ordinary type. Above the egg support a heating unit 12 is provided, here shown as consisting of a plurality of radiating pipes connected with a heater 13. The type of heater and the type of heating unit within the heating chamber are not material to the present invention so long as the temperature can be controlled and maintained unvaryingly as required.

At any convenient point relative to the egg chamber, an auxiliary chamber 14 is provided, here shown as being erected directly upon the top of the egg chamber structure. The auxiliary chamber 14 is provided with a plurality of vents 15 and with a heating element located therein, here shown as the circulating pipes 16. The pipes 16 are heated by a heater 17, and preferably an expansion tank 18 is provided with a vent tube 19, whereby the level of the heating fluid within the system is maintained at such level as to at all times fill the pipes 16.

The employment of the auxiliary heater 17 enables the operator to maintain in the pipes 16 a temperature wholly independent of the temperature maintained in the egg chamber by the pipes 12 and heater 13. Additional means, as the valves 20, are also provided for regulating the flow of heating fluid within the pipes 16, thereby further regulating the heat within the auxiliary chamber 14. A thermometer 21 is provided for disclosing to the operator the temperature within the auxiliary chamber 14, whereby accurate results may be secured.

Communicating with the auxiliary chamber 14 are conduits 22, which also communicate with the egg chamber 10 at the bottom, as indicated more particularly at Figs. 1 and 3, cages 23 being provided to cover the ends of the conduits within the egg chamber to prevent the introduction of extraneous matter or the hatched chicks.

Conduits 24 are also provided communicating with the atmosphere beneath the egg chamber and branching to form outlets 25 within the egg chamber above the heating element 12. By the heating of the air within the auxiliary chamber 14 it is caused to rise and be discharged through the vents 15, thereby attenuating the air in such chamber. The attenuation is partially balanced by air inducted into such auxiliary chamber through the conduits 22 from the egg chamber, thereby attenuating the aerostatic pressure in the egg chamber, which, in turn, is partially balanced by the induction of air through the conduits 24. Under normal working conditions the aerostatic tension within the egg chamber is always less than that of the atmosphere by the resistance of the conduits 24 and the inertia of the air.

Whether the maintaining of the tension in the egg chamber at less than atmosphere is of essential importance in the hatching of chicks is not positively known but it has been demonstrated beyond a doubt that an incubator ventilated in the manner hereinbefore described produces a greater percentage of hatch and stronger chicks than by any other system of ventilating yet found.

The variable control of volumetric displacement by means of the auxiliary educting mechanism also plays an important part in the percentage of hatch and strength of chicks, as the amount of fresh air supplied to the eggs varies at different periods during incubation, independently of variations in temperature and humidification which may also be controlled by the structures disclosed.

The independent heating means and the controllable independent ventilating means are therefore highly important features in the present invention.

I claim,—

1. The combination with an incubator embodying an egg chamber and a heating element located adjacent the top of the egg chamber, of a box located upon the top of the incubator and provided with vents, a heating element disposed within the box, a conduit leading from the bottom of the egg chamber and discharging into the bottom of the box, and a conduit leading from the atmosphere and discharging into the top of the egg chamber above and upon the heating element therein.

2. The combination with an incubator embodying an egg chamber, an egg support, and a heating element located above the egg support, of a heating compartment disposed higher than the egg chamber, an element for heating the compartment, a conduit leading from the egg chamber beneath the egg support and discharging into the compartment, and a conduit communicating with the atmosphere below the chamber and discharging into the top of the chamber above and upon the heating element therein.

3. The combination with an incubator embodying an egg chamber and a heating element located adjacent the top of the egg chamber, of a box located upon the top of the incubator and provided with vents, a heating element disposed within the box, a conduit leading from the bottom of the egg chamber and discharging into the bottom of the box, a conduit leading from the atmosphere and discharging into the top of the egg chamber above and upon the heating element therein, and means to regulate the heating efficiency of the elements independently.

4. The combination with an incubator embodying an egg chamber, an egg support, and a heating element located above the egg support, of a heating compartment disposed higher than the egg chamber, an element for heating the compartment, a conduit leading from the egg chamber beneath the egg support and discharging into the compartment, a conduit communicating with the atmosphere below the chamber and discharging into the top of the chamber above and upon the heating element therein, and means to regulate the heating efficiency of the elements independently.

5. The combination with an incubator embodying an egg chamber and a heating element located adjacent the top of the egg chamber, of a box located upon the top of the incubator and provided with vents, a heating element disposed within the box, a conduit leading from the bottom of the egg chamber and discharging into the bottom of the box, a conduit leading from the atmosphere and discharging into the top of the egg chamber above and upon the heating element therein, and independent sources of heat supply for the elements.

6. The combination with an incubator embodying an egg chamber, an egg support and a heating element located above the egg support, of a heating compartment disposed higher than the egg chamber, an element for heating the compartment, a conduit leading from the egg chamber beneath the egg support and discharging into the compartment, a conduit communicating with the atmosphere below the chamber and discharging into the top of the chamber above and upon the heating element therein, and independent sources of heat supply for the elements.

In testimony whereof I affix my signature.

ALFRED THRUSTON POPE.